(12) United States Patent
Ramamurthi et al.

(10) Patent No.: US 7,058,632 B1
(45) Date of Patent: Jun. 6, 2006

(54) METHOD AND SYSTEM FOR FACILITATING EXECUTION OF A USER-INPUTTED MESSAGE IN A CLIENT-SERVER DATABASE NETWORK

(75) Inventors: Subramaniam Ramamurthi, Rancho Santa Margarita, CA (US); Mark Minoru Higa, Seal Beach, CA (US); Chi Lin, Chino Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 416 days.

(21) Appl. No.: 10/186,037

(22) Filed: Jun. 27, 2002

(51) Int. Cl.
*G06F 7/00* (2006.01)
*G06F 17/30* (2006.01)
(52) U.S. Cl. .............................. 707/10; 707/3; 707/104
(58) Field of Classification Search .................. 707/10, 707/100, 3, 104; 709/238
See application file for complete search history.

(56) References Cited

U.S. PATENT DOCUMENTS

| 559,670 | A | 5/1896 | Brough |
| 5,583,986 | A | 12/1996 | Park et al. |
| 5,805,823 | A | 9/1998 | Seitz |
| 6,185,195 | B1 | 2/2001 | Leung |
| 6,330,582 | B1 | 12/2001 | Kuo et al. |
| 6,510,429 | B1 * | 1/2003 | Todd ........................... 707/10 |
| 6,510,434 | B1 * | 1/2003 | Anderson et al. ........... 707/100 |
| 6,766,377 | B1 * | 7/2004 | Grabelsky et al. .......... 709/238 |
| 6,970,870 | B1 * | 11/2005 | Dweck et al. ................ 707/10 |
| 6,983,288 | B1 * | 1/2006 | Kirkwood et al. ...... 707/103 R |
| 2004/0007121 | A1 * | 1/2004 | Graves et al. .............. 89/1.11 |

* cited by examiner

*Primary Examiner*—Don Wong
*Assistant Examiner*—Thanh-Ha Dang
(74) *Attorney, Agent, or Firm*—Alfred W. Kozak; Mark T. Starr; Nathan Cass

(57) ABSTRACT

In a client-server database network having a user-interface layer communicating with a database-interface layer via a middleware communication layer, a method is disclosed for facilitating execution of a user-inputted message. The method includes receiving the user-inputted message from the user-interface layer in the middleware communication layer, and forwarding the received user-inputted message to the database-interface layer based on a predetermined attribute contained in the received user-inputted message. The method further includes executing the forwarded user-inputted message in the database-interface layer based on the predetermined attribute. In this way the involvement of the middleware communication layer in the execution of the user-inputted messages is minimized, thus facilitating the overall execution of the user-inputted messages in the client-server database network.

30 Claims, 12 Drawing Sheets

METHOD AND SYSTEM FOR FACILITATING EXECUTION OF A USER-INPUTTED MESSAGE IN A CLIENT-SERVER DATABASE NETWORK

FIELD OF THE INVENTION

This invention relates to the field of computer based information systems such as a computer networked databases. More particularly, the present invention is directed to systems and methods for facilitating execution of a user-inputted message in a client-server database network.

BACKGROUND OF THE INVENTION

Computer based information systems are in widespread use today, ranging from simple small area file-sharing networks to global and sophisticated computer networked databases which provide the backbone for today's World Wide Web.

Generally, a user, such as a system administrator, administers the operations of the computer networked databases utilizing a client application such as a Windows™ application, which resides at the user's location such as on the user's personal computer. The client application is typically interfaced to a communication subsystem which is in turn interfaced to the networked database at a local or remote location. Pursuant to the issuance of a system command message by a user for administrating the database, such as a command to create a database backup, the client application forwards the message to the communication system which in turn communicates with the computer networked database for performing the desired task.

One form of a computer networked database is based on a client-server database network model in which a client-end having an application layer and a middleware communication layer communicates with a server-end having a database-interface layer interfacing with a database server communicating with one or more databases. In this model, a system command message issued at the client-end, such as a Windows™ operating environment, is received in the application layer, such as graphical user interface (GUI) layer and forwarded to the middleware communication layer. The middleware communication layer then communicates the message to the server-end, such as a Clearpath Master Control Program (MCP) environment, where the message is received by the database-interface layer for execution in the database server, such as an Enterprise Database Server.

While in widespread use today, the foregoing client-server database network model is not without shortcomings. Generally, the system command messages contain function-calls and sub-function calls for execution by the database-interface layer. Typically, a function call such as "Create-Backup" invokes execution of at least one task by the database-interface layer such creating a backup of the database. Each function call is comprised of one or more sub-function calls, each of which each invokes execution of a portion of the task associated with the function call. For example, a "Create-Backup" function call may contain sub-function calls for reading of the data in the original database, creating a new database structure for the backup database, and inserting the read data into the backup database. A function-call may be comprised of a larger number of sub-function calls, such as a hundred or more sub-function calls, for accomplishing a desired task.

Currently, a middleware communication layer which receives the system command message first extracts and validates the function calls and their associated sub-function calls, and then forwards them to the database-interface layer one sub-function at a time, for execution. The database-interface layer then executes the sub-function call on the database server, receives execution results from the database server and relays this result back to the middleware communication layer before receiving the next sub-function call for execution. The foregoing sequence of operations for execution of a desired task incurs a disadvantageously large amount of delay overhead in transmission of each sub-function and increases the exposure of the execution of the command message to transmission errors. In addition, it results in an inefficient use of resources for both the middleware communication layer, the server-end database components and the transmission mediums involved.

Another disadvantage associated with the current approach arises when a new command type, such as a new function call and its associated sub-function calls, is to be added to the repertoire of commands executed by the database-interface layer. In this case, an often extensive set of software modifications and compilations must be disadvantageously made in the middleware communication layer so that the middleware communication layer can recognize the new function call and all its associated sub-function calls for a successful validation, prior to the forwarding to the database-interface layer one sub-function at a time for execution. The foregoing set of software modifications and compilations disadvantageously preoccupies the system resources and introduces further delay into the overall execution of a system command message.

An ongoing need thus exists to minimize the involvement of the middleware communication layer in the execution of a system command message in a client-server database network.

SUMMARY OF THE INVENTION

It is an object of the present invention to provide a system and a method for facilitating execution of a user-inputted message in a client-server database network having a user-interface layer communicating with a database-interface layer via a middleware communication layer.

An advantage of the present invention is that the involvement of the middleware communication layer in the execution of the user-inputted messages is minimized, thus facilitating the overall execution of the user-inputted messages in the client-server database network.

These and other objects, which will become apparent as the invention is described in detail below, are provided in the context of a client-server database network having a user-interface layer communicating with a database-interface layer via a middleware communication layer, wherein a method is disclosed for facilitating execution of a user-inputted message. The method includes receiving the user-inputted message from the user-interface layer in the middleware communication layer, searching for a predetermined attribute contained in the received user-inputted message, and forwarding the received user-inputted message to the database-interface layer based on the predetermined attribute contained in the received user-inputted message. The method further includes executing the forwarded user-inputted message in the database-interface layer based on the predetermined attribute.

Still other objects, features and advantages of the present invention will become readily apparent to those skilled in the art from the following detailed description, wherein is shown and described only the exemplary embodiments of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

The accompanying drawings, which are incorporated in and constitute a part of this specification, illustrate one or more embodiments of the invention and, together with the present description, serve to explain the principles of the invention.

In the drawings.

DETAILED DESCRIPTION OF THE INVENTION

Figure 1:
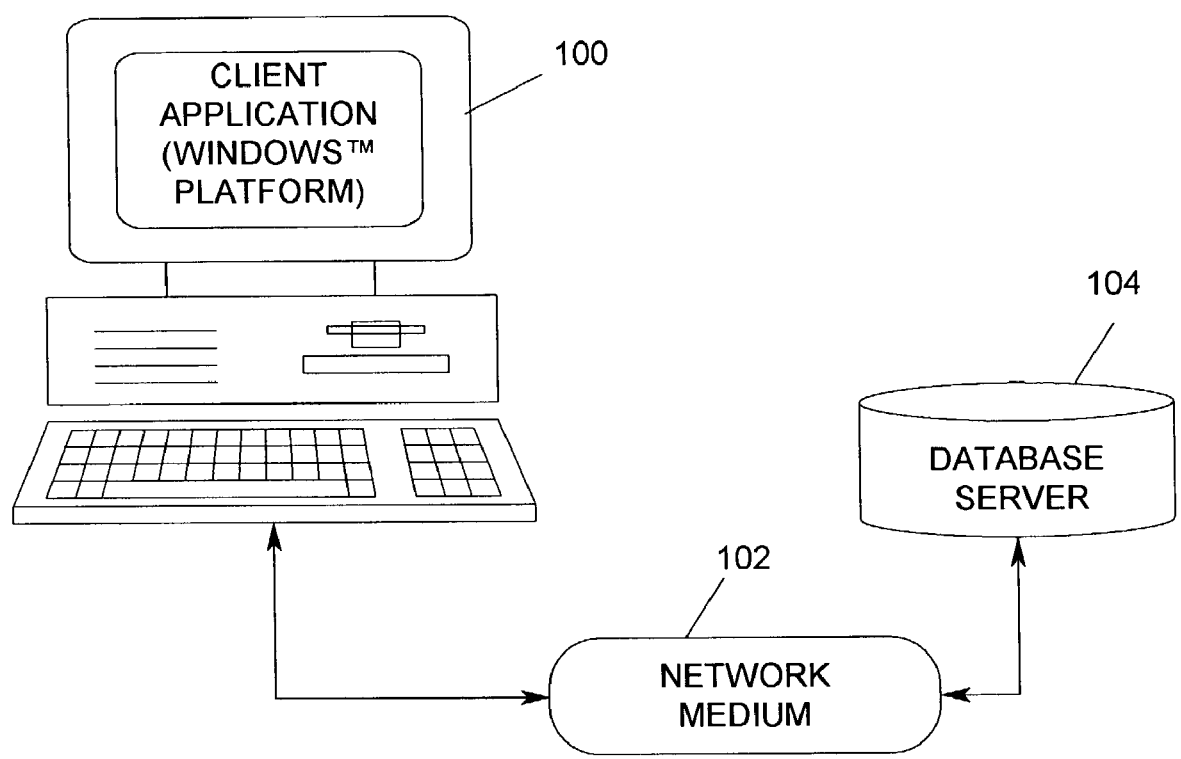
FIG. 1 is a top-level block diagram of a system that may employ the method and system of the present invention.

Several embodiments of the present invention are described herein in the context of facilitating execution of a user-inputted message in a client-server database network. Those of ordinary skill in the art will realize that the following description of the present invention is illustrative only and is not intended to be in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

In the interest of clarity, not all of the routine features of the implementations described herein are described. The present invention may be practiced in conjunction with various client-server database networks based on a database operations center model that are conventionally used in the art, and only so much of the commonly practiced operations are included herein as are necessary to provide an understanding of the present invention. It will of course be appreciated that in the development of any such actual implementation, numerous implementation-specific decisions must be made to achieve the developers' specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Before proceeding with a description of the system and method of the present invention, a summary of Terminology used herein is provided, which may be helpful in understanding the disclosed embodiment.

A function call is a predetermined database-related administrative task issued by a user such as a system administrator, for execution in a database. A function call is generally comprised of a number of sub-function calls, each of which perform a portion of the task associated with the function call.

Control-data are information on the structure of a system command message (i.e., information about the message). Typically, control-data contain information on the encoding data, function call, and sub-function call, which signifies the format of a system command message.

Data as used throughout this disclosure refers to information that is to be transmitted along with the control-data for the message, and which contains data strings of predetermined attributes separated by delimiters.

Synchronous execution mode is a form of execution of messages in which the sender of a message, such as a function call to be executed, awaits receipt of a response, such as the execution results, to the sent message from the recipient before resuming its operations. The recipient generally forwards the response to the sender immediately after its availability wherein the sender resumes its operations after the receipt of the response.

Asynchronous execution mode is a form of execution of messages in which the sender of a message, such as a function call to be executed or execution-status query message, does not await the receipt of a response to the sent message, such as a query-response, from the recipient before resuming its operations. The recipient generally provides the sender with a task identification number for a received function call message immediately after the receipt of the message. Once the requested execution results response becomes available however, the recipient forwards it to the sender only upon receiving an execution-status query message from the sender requesting the forwarding of the available response. The provided task identification number is included in the execution-status query message by the sender based on which the recipient can identify the message queried by the sender.

Referring now to the drawings and FIG. 1 in particular, a top-level block diagram of a client-server database network system that may employ the method and system of the present invention is shown. A client application 100 executing on a computing system such as a personal computer is illustrated. The client application 100 is in communication with a network-based medium 102, such as a token ring network, to communicate with a database servers 104. Database server 104 may be local or at a remote location relative to the computing system executing client application 100. Communications from client application 100 include sending of user-inputted messages to and receiving responses from database server 104. For simplicity, only one computing system executing a client application 100 is illustrated in FIG. 1 although it should be noted that many more computing systems on which multiple client applications 100 reside may also be coupled to the a network-based medium 102 to communicate with a number of database servers 104.

Figure 2:
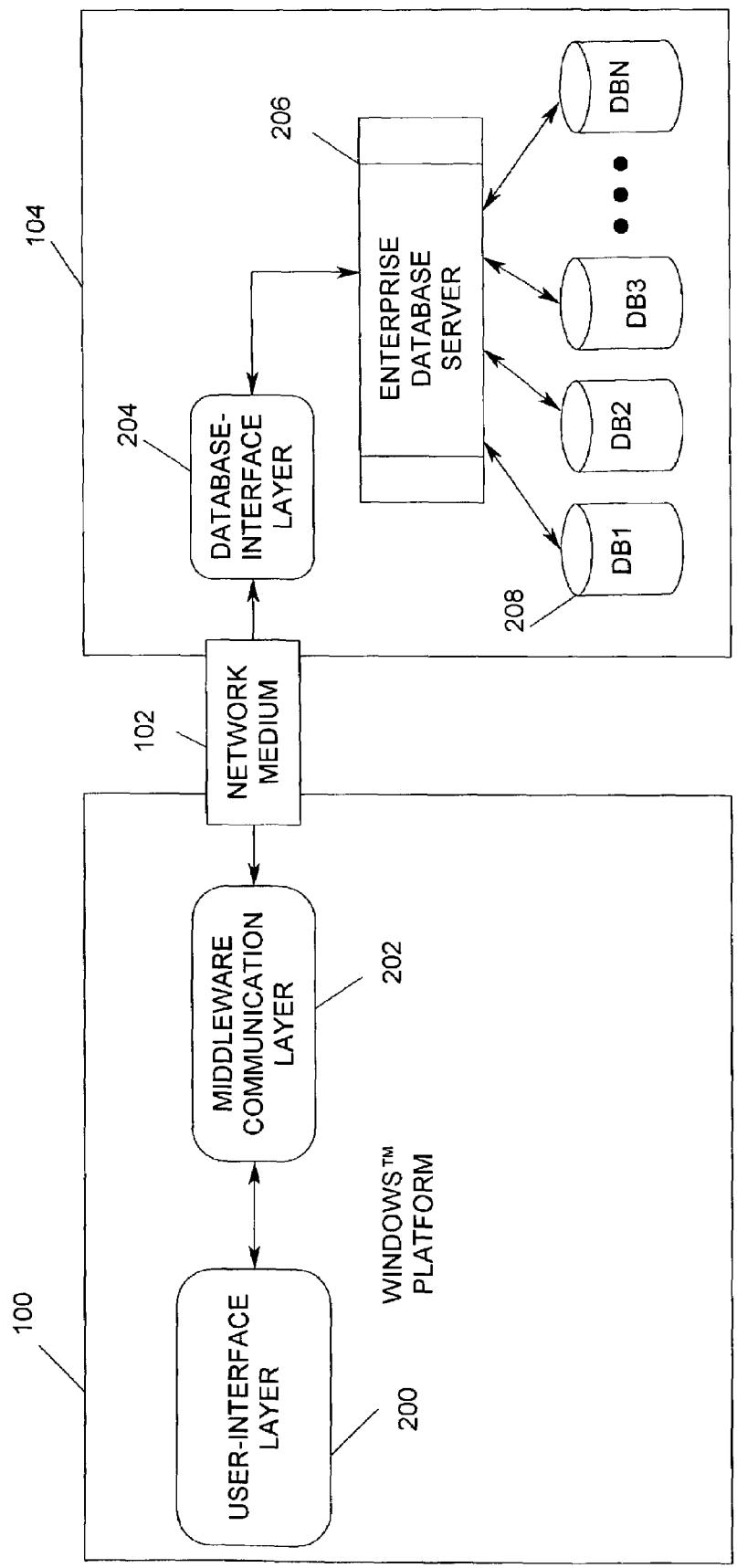
FIG. 2 is an expanded block diagram of an exemplary system that may employ the method and system of the present invention.

FIG. 2 is an expanded block diagram of an exemplary client-server database network system that may employ the method and system of the present invention as shown in FIG. 1. To better illustrate the functioning of the present invention, an exemplary embodiment of the present invention is used throughout the specifications in the context of a Unisys Database Operations Center version 7.0 in which the network medium 102 is a network bus and interfacing with a client-end Windows™ client application 100 (such as substantially all versions of Microsoft Windows released from 1995–2000, Windows NT and XP) at one end and with a server-end 104 of an Enterprise Database server operating on a Clear path Master Control Program (MCP) platform at the other end, although it should be noted that the present invention is not in anyway limited to the foregoing exemplary products.

As shown in FIG. 2, the client application 100 includes a user-interface layer 200 and a middleware communication layer 202. The middleware communication layer 202 provides connectivity between the user-interface layer 200 and the server-end 104 via the network medium 102. The server-end 104 includes a database-interface layer 204 in communication with an Enterprise database server 206 communicating with one or more databases 208. The client application 100 and the server-end 104 interact such that the user-interface layer 200 accepts user-inputted messages, forwards them to the server-end 104 via the middleware communication layer 202 and network medium 102. The database-interface layer 204 handles the user requests by initiating Enterprise database server 206 task, monitors the status of the tasks and returns responses back to the user-interface layer 200 for display to the user. In an exemplary embodiment, the user-interface layer 200 is a graphical user interface (GUI) layer.

A user-inputted message is a system command message typically issued by a system administrator for administering at least one the databases 208. Generally, a user-inputted message includes at least one function call comprising of a number of associated sub-function calls for execution by the database interface layer 204 via Enterprise database server 206 in at least one of databases 208. A function call, such as Create-Backup invokes execution of at least one predetermined task, such as creating a backup of a database, by the database interface layer 204 with each associated sub-function call invoking the execution of a portion of the predetermined task.

Although currently Database Operations Centers enjoy widespread usage for administering of databases, improvements can always be made, particularly when a new command type, such as a new function call and its associated sub-function calls, is to be added to the repertoire of commands executed by the database-interface layer 204. Currently, a middleware communication layer 202 which receives the system command message first extracts and validates the function calls and their associated sub-function calls, and then forwards them to the database-interface layer 204 one sub-function at a time, for execution. The database-interface layer 204 then executes the sub-function call on the database server 206, receives execution results from the database server 206 and relays this result back to the middleware communication layer 202 before receiving the next sub-function call for execution. Since often a function-call may be comprised of a larger number, such as a hundred or more, of sub-function calls for accomplishing a desired task, the foregoing sequence of operations for execution of a desired task incurs a disadvantageously large amount of delay overhead in an individual transmission of each sub-function and increases the exposure of the execution of the command message to transmission errors in the network medium 102. In addition, it results in an inefficient use of resources for both the middleware communication layer 202, the server-end 104 and network medium 102. Furthermore, the addition of a new function call often results in an extensive set of software modifications and compilations in the middleware communication layer 202 so that the middleware communication layer 202 can recognize the new function call and all its associated sub-function calls for a successful validation, prior to the forwarding to the database-interface layer 204 one sub-function at a time for execution. The foregoing set of software modifications and compilations disadvantageously preoccupies the system resources and introduces further delays into the overall execution of a system command message.

Figure 3:
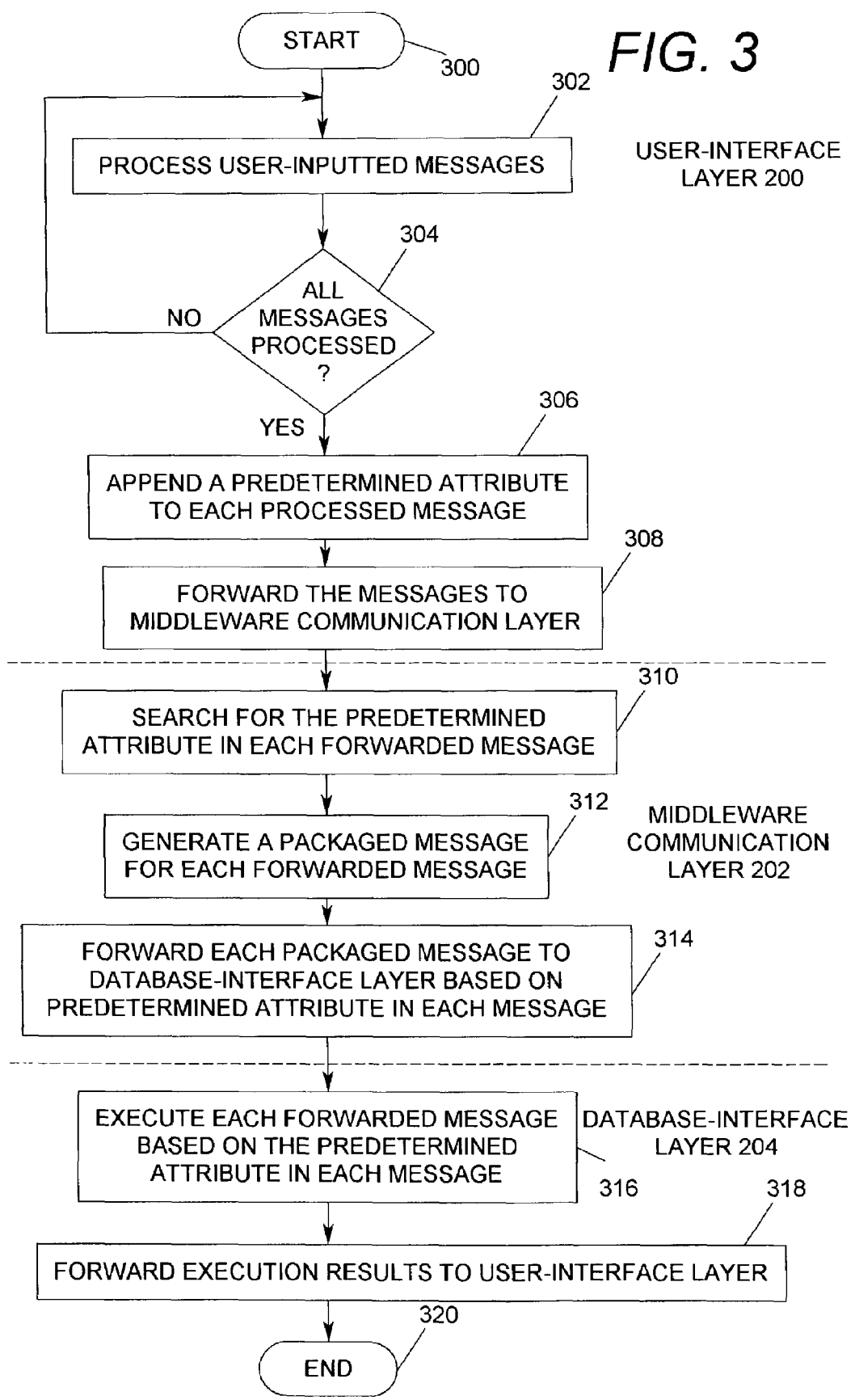
FIG. 3 is a flow chart of the process for facilitating execution of a user-inputted message according to a method of the present invention.

The overall operations of the present invention will now be disclosed in greater detail in FIGS. 3–8 in conjunction with FIG. 2. FIG. 3 is a flow chart of the process for facilitating execution of a user-inputted message according to a method of the present invention. As shown in FIG. 3, the process flow begins at block 300 at where the user-inputted messages are first received in the user-interface layer 200. At block 302, each user-inputted message is processed for eventual forwarding to the middleware communication layer 202 as described below in greater detail in conjunction with FIGS. 4, 5A and 5B. Next, in the decision block 304, a determination is made as to the processing status of all of the user-inputted messages, wherein the process of block 302 repeats for each user-inputted message until all of the user-inputted messages have been processed. The flow then proceeds to block 306 where a predetermined attribute is appended to each processed message. In an exemplary embodiment, the predetermined attribute is a predetermined transmission function call recognized by a middleware communication layer 202 adapted to recognize the function call. Next, in block 308, the processed messages with their corresponding predetermined attribute are forwarded to the middleware communication layer 202 via the network medium 102.

The forwarded user-inputted message from the user-interface layer 200 are then received in the middleware communication layer 202 where in block 310 a search is made in each forwarded user-inputted message for the predetermined attribute contained therein. Generally, a user-inputted message includes at least one database system function call comprising of a number of associated sub-function calls for execution by the database interface layer 204 via Enterprise database server 206 in at least one of databases 208. In the present invention, the predetermined attribute contained in each message instructs the middleware communication layer 202 to forward each received user-inputted message to the database interface layer 204 without searching the received user-inputted message for the database function calls. In this way, the user-inputted messages are simply forwarded to the database-interface layer 204 and their sub-function calls are not retrieved for individual transmission to and execution by the database-interface layer 204. Next, at block 312 a packaged message is generated for each forwarded message as described in greater detail below in conjunction with FIGS. 4–6. The flow then proceeds to block 314 where based on the predetermined attribute in the manner described above, the packaged messages are simply forwarded to a database-interface layer 204 adapted to recognize the predetermined attribute.

Once received by database-interface layer 204, in block 316 the forwarded user-inputted message are executed by database-interface layer 204 based on the predetermined attribute contained in the forwarded message. The predetermine attribute instructs the database-interface layer 204 to execute the received function calls and sub-function calls contained in the message to their collective completion before proceeding to block 318 where the execution results are forwarded back to the user-interface layer 200 via the middleware communication layer 202 and the network medium 102. The flow then proceeds to block 320 where the overall process draws to an end.

One advantage of the foregoing feature of the present invention over the prior art is that by using a predetermined attribute for instructing the middleware communication layer 202 to forward the user-inputted message to the database-interface layer 204 without searching for the database function calls in the messages, the involvement of the middleware communication layer 202 in the execution the database function calls is advantageously minimized. In addition, the predetermined attribute also instructs the database-interface layer 204 to forward the execution results back to the user-interface layer 200 via the middleware communication layer 202 upon completion of execution of substantially all sub-function calls, thus further advantageously minimizing the involvement of the middleware communication layer 202 in the overall process.

Another advantage of the foregoing feature of the present invention over the prior art is that since the middleware communication layer 202 now simply forwards the user-inputted message to the database-interface layer 204 without searching for the database function calls in the messages, the pre-adapting of the middleware communication layer 202 to recognize the function call and its associated function calls is no longer necessary in the cases of a new function call used. Thus, the often extensive set of software modifications and compilations otherwise required to be made in the middleware communication layer 202 for recognition of a new function call and all its associated sub-function calls for a successful validation can be advantageously minimized or avoided.

In an exemplary embodiment, the user-inputted message is a plurality of user-inputted messages and the database-interface layer 204 is adapted to concurrently execute the plurality of user-inputted messages. An advantage of the foregoing feature of the present invention over the prior art is that since the middleware communication layer 202 now simply forwards the user-inputted messages to the database-interface layer 204, the database-interface layer 204 can concurrently receive and execute the plurality of user-inputted messages, therefore resulting in a faster overall processing of the plurality of user-inputted messages.

Figure 4:
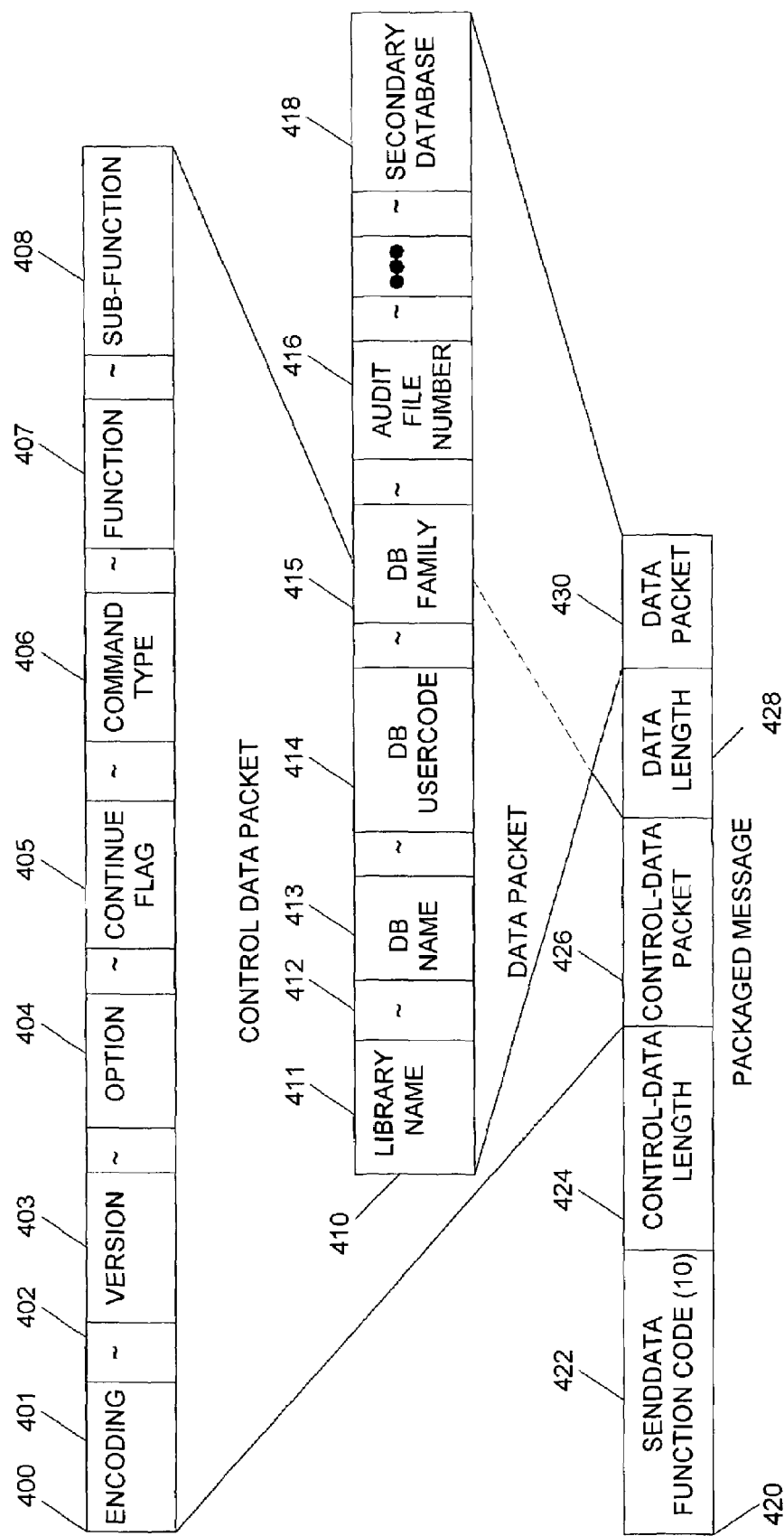
FIG. 4 is a schematic diagram illustrating the generation of a packaged message according to a method of the present invention.

The processing operations of block 302 in FIG. 3 will now be discussed in greater detail in FIGS. 5A and 5B, in conjunction with the schematic diagram of FIG. 4. As shown in FIG. 4, each user-inputted message is processed in the form of two separate packets of control-data packet 400 and the data packet 410. Control-data packet 400 contains the information on the structure of a system command message (i.e., information about the message) and data packet 410 contains data strings signifying function calls, sub-function calls, encoding data, predetermined attributes, etc. separated by delimiters.

Figure 5A:
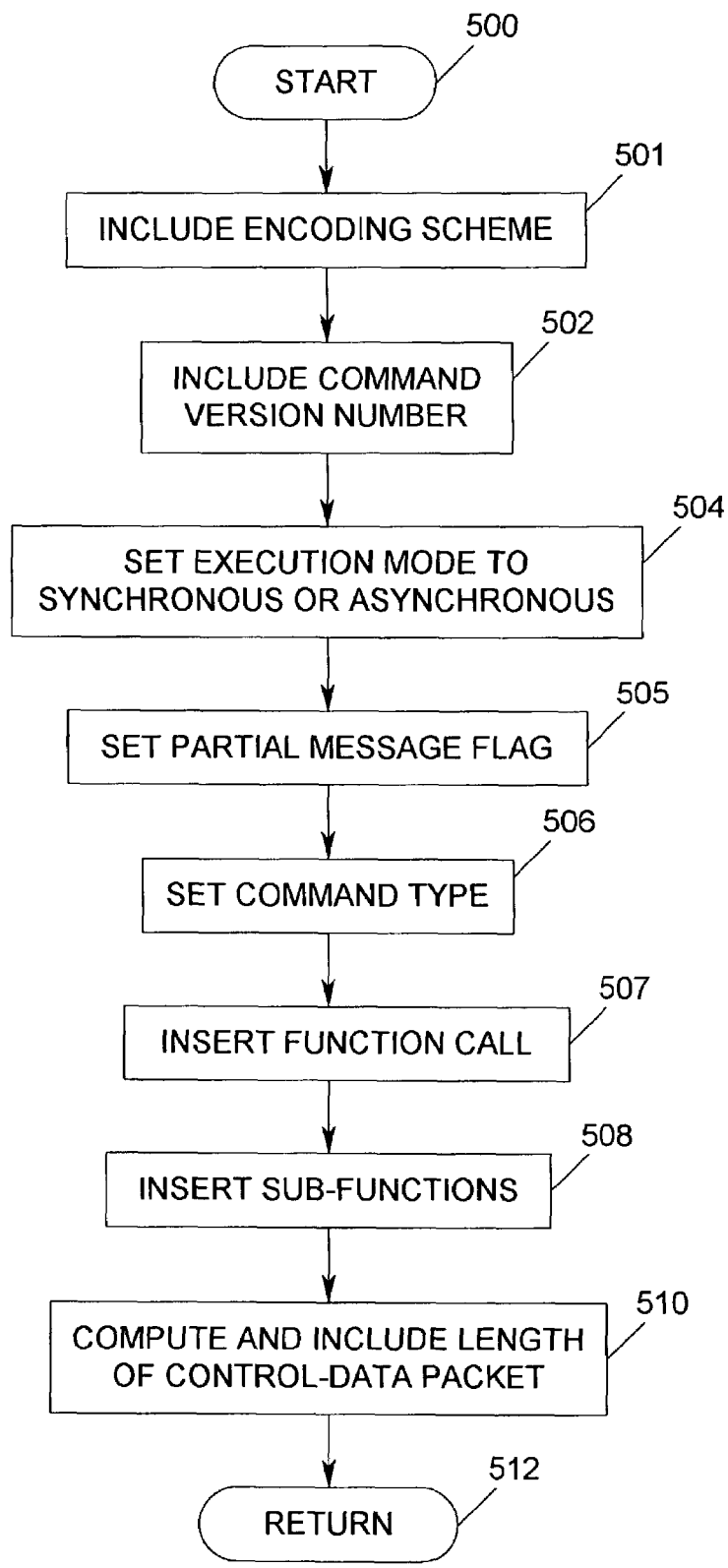
FIG. 5A is a flow chart of the process for generating a portion of the packaged message as illustrated in FIG. 4 according to a method of the present invention.

FIG. 5A illustrates the processing of the packet for control-data packet 400 starting at block 500. In block 501 and encoding scheme is included in the packet as shown by data field 401. The encoding scheme provides added organization to the data packets by indicating a predetermined delimiter used to separate the various fields in both the control data 410 and the data packet 410, such as a delimiter "~" used in fields 402 for separating each field in the control-data packet 400. Next, at block 503 a version number for the system command sent by the user-inputted message is provided in field 403, such for example version 2.1 of the Create-backup command. The process flow continues to block 504 where the execution mode of the message is selected in the form of a synchronous or asynchronous mode of execution, an inserted into field 404. In an exemplary embodiment, a predetermined set of numbers inserted into field 404 may be used to indicate the desired option, such as insertion of number "0" to signify a synchronous option and "1" for an a synchronous option. Next, at block 505, a flag is set in field 405 if a message is to be partially included in the current control data packet 400. This may be necessary at times when the length of the message exceeds the length of the packet as allowed by the communication protocols used, and therefore more than control-data packet 400 is to be used to transmit the entire message. This option informs the recipient to look for the remainder of the message in the subsequent transmissions. In an exemplary embodiment, a predetermined set of numbers inserted into field 405 may be used to indicate the partial status of the message, such as insertion of number "0" to signify the packet contains the complete message, "1" to signify a first block of data is sent with more to come, "2" to signify continuation block of data is sent and more to come and "3" to signify the last block of data is sent. Next, in block 506 the type of command in the message is indicated, such as a whether a message contains a system command or a query command, and inserted into field 406.

The flow then proceeds to block 507 where a function call is inserted into field 407. A function call is a predetermined database-related administrative task issued by a user such as a system administrator, for execution in the database. A function call generally comprise of a number of sub-function calls, each of which perform a portion of the task associated with the function call. In block 508, one sub-function calls associates with the sub-function call of field 407 is included in field 408. In an exemplary embodiment, a separate control data packet 400 is used for each sub-function call associated with a function call until all sub-function calls of a given function call are included. Next, in block 510, the overall length of the control data packet 400 is computed and can be either included in the control-data packet 400 or transmitted separately. Finally, the flow proceeds to block 512 where the process is returned to block 302 in FIG. 3 for processing of the data-packet 410.

Figure 5B:
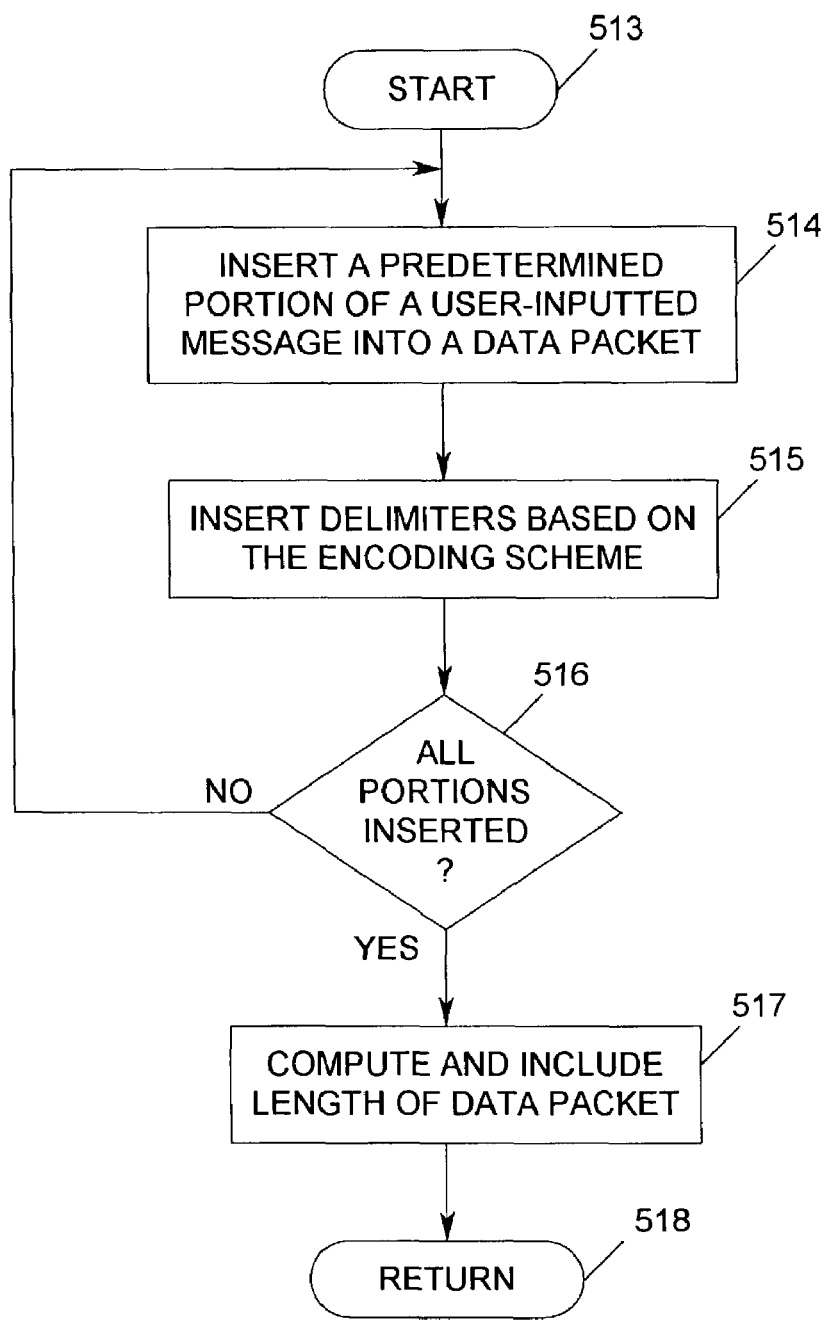
FIG. 5B is a flow chart of the process for generating another portion of the packaged message as illustrated in FIG. 4 according to a method of the present invention.

FIG. 5B illustrates the processing of the data packet 410 starting at block 513. The structure of the data packet 410 can be customized by the user and thus depends on the actual system command or query, and other attributes inputted by the user. The data packet 410 shown in FIG. 4 is therefore an exemplary data packet used only to illustrate the data packet 410 for a particular command having exemplary attributes specified by a user. As shown in FIG. 5B, in block 514, a predetermined portion of the user-inputted message is inserted into a data packet 410, such as those pertaining to separate fields shown in data packet 410, such as for example the Library Name field 411 which contains the look-up function library for the function-call inputted by the user. Next, in block 515, a delimiter field 412 of the type set in the control data packet 400 (such as "~") is used to separate each data field in data packet 410. Next, in decision block 516, it is determined whether all the user-inputted data have been inserted into data packet 410. In the exemplary data packet 410 shown in FIG. 4, the user has selected to specify a number of attributes for the execution of the message. Each of these attributes are inserted into a separate field in the data-packet 410 and separated by a delimiter field 412. For example, the user-specified name of the database to be used is inserted in DB Name field 413, the username of the user is inserted in DB Usercode field 413, the database network family in which the database resides or is a part of is inserted in DB Family field 413, an audit log file for the database is inserted in Audit file number 416, and the name of another database for execution of the command if for example the first database is unavailable is inserted in Secondary Database field 418.

Next, in block 517, the overall length of the data packet 410 is computed and can be either included in the data packet 410 or transmitted separately. Finally, the flow proceeds to block 518 where the process is returned to block 302 in FIG. 3.

Returning to FIG. 3, once all the user-inputted message are processed in the manner described in FIG. 5A and FIG. 5B, the flow then proceeds to block 306 where a predetermined attribute is appended to each processed message. In an exemplary embodiment, the predetermined attribute is a predetermined transmission function call recognized by a middleware communication layer 202 adapted to recognize the function call. The transmission function call can be represented in the form of a predetermined number or an alpha-numeric designation recognized by the middleware communication layer 202. Next, in block 309, the processed messages with their corresponding predetermined attribute are forwarded to the middleware communication layer 202 via the network medium 102.

Figure 6:
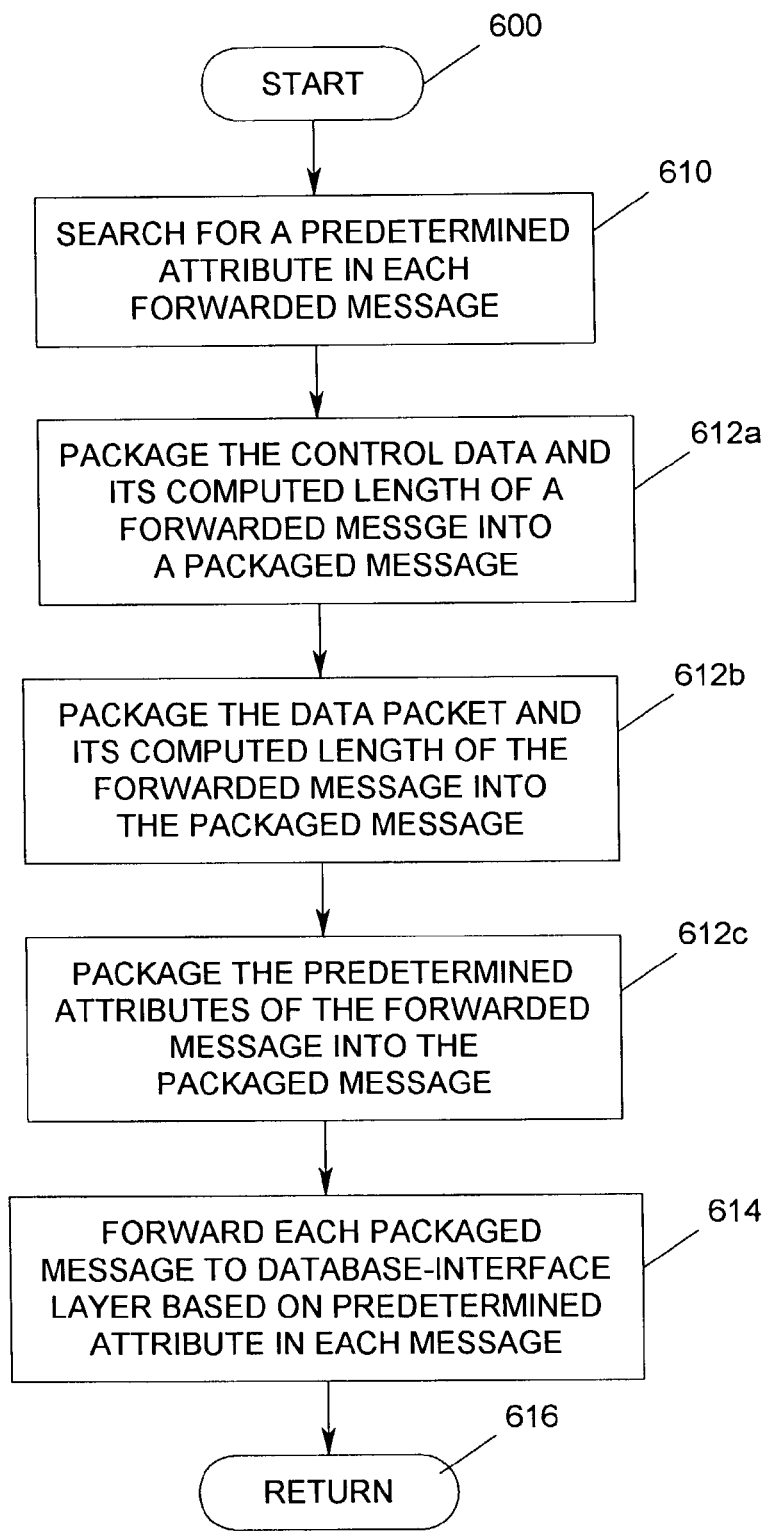
FIG. 6 is an expanded flow chart providing further details on a portion of the process for facilitating execution of a user-inputted message according to a method of the present invention as illustrated in FIG. 3.

The processing operations of middleware communication layer 202 shown in blocks 310, 312 and 314 of FIG. 3 will now be discussed in greater detail in FIG. 6 and in conjunction with the schematic diagram of FIG. 4. As shown in FIG. 6, the process starts at block 600 where the forwarded messages are received in the middleware communication layer 202. Next, in block 610, the each forwarded message is searched for the predetermined attribute in each message. In an exemplary embodiment, the middleware communication layer 202 is adapted to search for the predetermined attribute in the forwarded user-inputted message. The predetermined attribute is a predetermined transmission function call which instructs the middleware communication layer 202 to forward each received user-inputted message to the database interface layer 204 without searching the received user-inputted message for the database function calls. The flow then proceed to blocks 612a, 612b and 612c which collectively describe in greater detail the operations of block 312 in FIG. 3, where in preparation for forwarding of the message to the database interface layer 204 based on the predetermined transmission function call, a packaged message 420 as shown in FIG. 4 is generated. In block 612a, the control-data packet 400 is inserted in its entirety in field 426 of the packaged message 420, following the control-data length field 424 which was also received as part of the forwarded message. Next, in block 612b, the data packet 410 is inserted in its entirety in field 430 of the packaged message 420, following the data length field 428 which was also received as part of the forwarded message.

The process flow then proceeds to block 612c where the predetermined attribute appended to the received forwarded message is also inserted into the packaged message 420 at field. In an exemplary embodiment, the middleware communication layer 202 is adapted to match the predetermined number or the alpha-numeric designation of the received predetermined attribute to an associated transmission function call used by the middleware communication layer 202, such as a SendData function, and insert the function call as the predetermined attribute in field 422. In an exemplary embodiment, the middleware communication layer 202 is also adapted to further match the predetermined number or the alpha-numeric designation of the predetermined attribute or its associated function call to a yet third designation that may be used by database interface layer 204 and insert that third designation, such as "function code(10)", as the predetermined attribute in field 422. Next, in block 614, each packaged message 420 is forwarded to the database interface layer 204 based on the transmission function call invoked by the predetermined attribute in each message. Finally, the flow proceeds to block 616 where the process is returned to process flow of FIG. 3 at block 316.

In an exemplary embodiment, the packaged message is forwarded to the database-interface layer 204 in the form of a function call, such as SendData (control-data length, control-data packet, data length, control-data packet) having as parameters, the control-data length, the control-data packet, the data length and the control-data packet that are packaged into the function call in the process blocks 612a and 612b in FIG. 6.

Figure 7A:
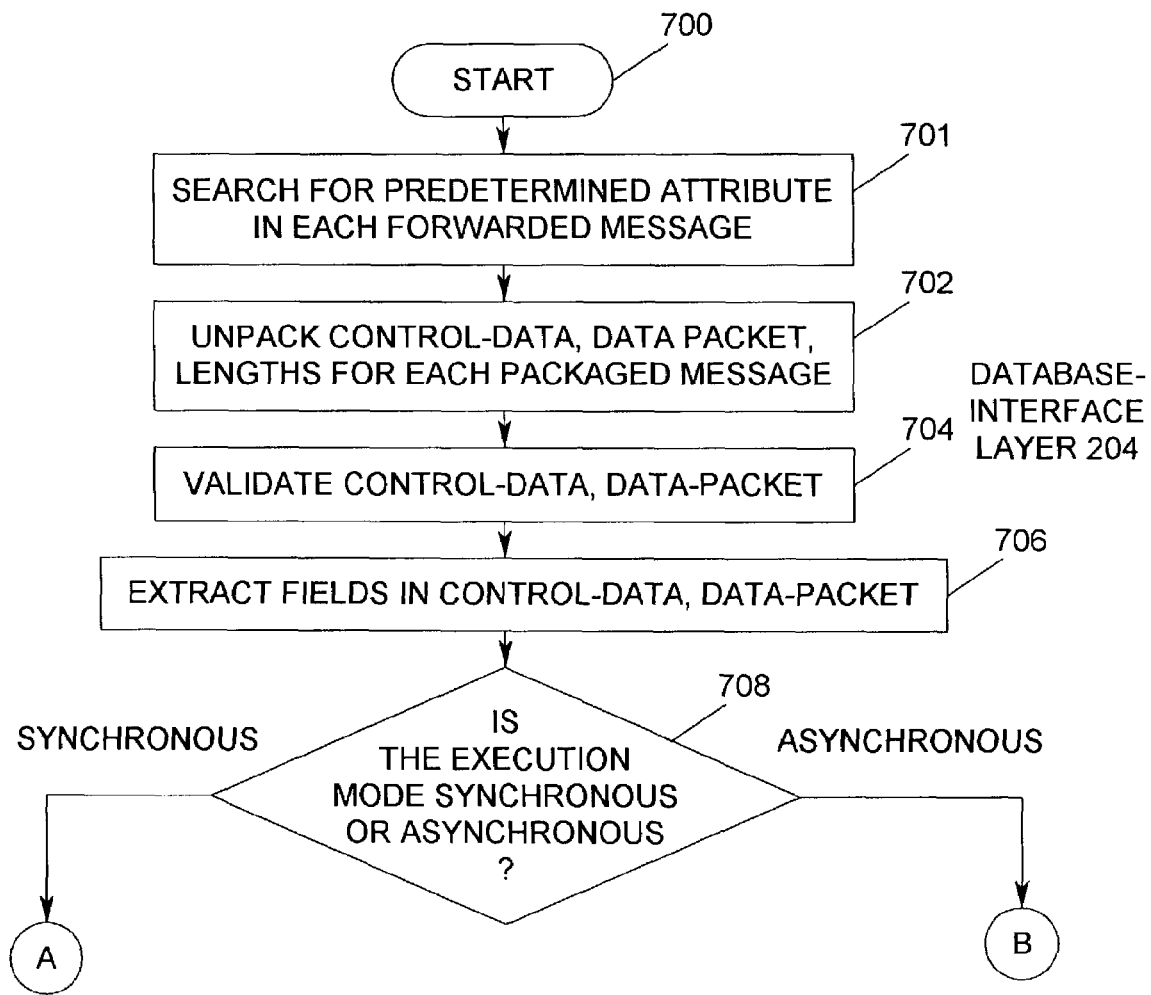
FIGS. 7A–7B collectively represent an expanded flow chart providing further details on another portion of the process for facilitating execution of a user-inputted message according to a method of the present invention as illustrated in FIG. 3.

The processing operations of database-interface layer 204 shown in blocks 316 and 318 of FIG. 3 will now be discussed in greater detail in FIGS. 7A–7B, starting with block 700 in FIG. 7A where the packaged messages 420 are received in the database-interface layer 204. As shown in FIG. 7A, in block 701, each forwarded packaged message 420 is searched by a database-interface layer 204 adapted to search for the predetermined attribute included in the received packaged message 420. The predetermine attribute instructs the database-interface layer 204 to execute the received function calls and sub-function calls contained in the packaged message 420 to their collective completion before proceeding to block 318 in FIG. 3 where the execution results are forwarded back to the user-interface layer 200 via the middleware communication layer 202 and the network medium 102.

Returning to FIG. 7A, the flow next proceeds to block 702 where each received message 420 is unpacked into packaged control-data packet 400, the data packet 410 and their associated lengths 424 and 428. Next, in block 704, the unpacked control-data packet 400, the data packet 410 are validated for transmission errors based on a data validation technique, such as a Checksum algorithm, well known in the art. After the validation, in block 706 the data fields in each of the control-data packet 400, the data packet 410 are extracted for use by the database-interface layer 204. The information extracted from fields 407 and 408 of the control-data packet 400 inform the database-interface layer 204 of the functions and sub-functions to be executed while those extracted from the execution option field 404 provide instruct the database-interface layer 204 as to which mode of execution has the user opted for execution of the functions and sub-functions. In an exemplary embodiment, the database-interface layer 204 is adapted to recognize the predetermined tasks associated with the function call and its associated sub-function calls. The extracted information on the execution mode is then used in the decision block 708 to determine a synchronous or asynchronous mode of execution for the functions and the sub-functions.

Figure 7B:
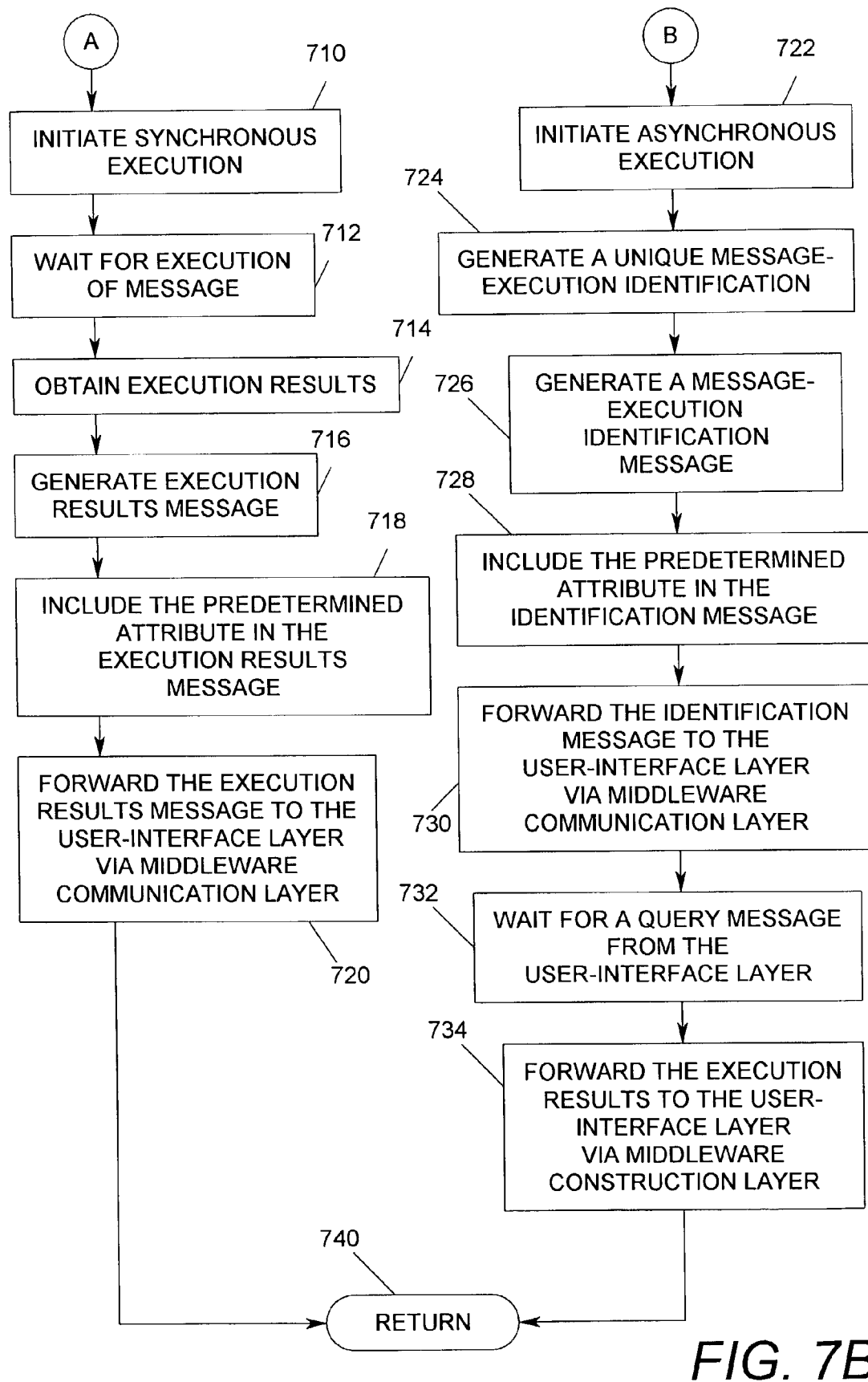

If the user has opted for a synchronous execution, the flow then proceeds to block 710 in FIG. 7B where a synchronous execution mode is initiated by the database-interface layer 204 in Enterprise database server 206 for execution of the database task associated with the function call, such as a task to create a database backup based on the received Create Backup function call. Next, in block 712, the database-interface layer 204, along with the user-interface layer 200 and middleware communication 202 waits the completion of the execution of the task by the Enterprise database server 206. Once the execution is completed, in block 714 the database-interface layer 204 obtains the execution results from the Enterprise database server 206 and then in block 716 generates a message containing the execution results. In block 718, the predetermined attribute is included in the execution results message and then in block 720 the execution results message is forwarded back to the user-interface layer 200 via the middleware communication layer 202. In an exemplary embodiment, the predetermined attribute is the same transmission function received in the packaged message 420 and the forwarding of the execution results is performed via inclusion of the execution results in a parameter of the transmission function for passing to the user-interface layer 200 by the middleware communication layer 202. The process then proceeds to block 740 where the flow is returned to block 320 in FIG. 3 where the overall process draws to an end.

Returning to the decision block 708 in FIG. 7A, if the user has opted for an asynchronous execution, the flow then proceeds to block 722 in FIG. 7B where an asynchronous execution mode is initiated by the database-interface layer 204 in Enterprise database server 206 for execution of the database task associated with the function call, such as a task to create a database backup based on the received Create Backup function call. Next, in block 724, a unique message-execution identification is generated by the Enterprise database server 206 to uniquely identify the task being executed for future reference by the user-interface layer 200 which queries the database-interface layer 204 at predetermined time intervals for an execution-status of the task based on the unique message-execution identification. Next, in block 726, a transmission message is generated to include the message-execution identification message, and in which the predetermined attribute is also included in block 728.

In block 730, the transmission message is forwarded back to the user-interface layer 200 via the middleware communication layer 202. In an exemplary embodiment, the predetermined attribute is the same transmission function received in the packaged message 420 and the forwarding of the execution results is performed via inclusion of the transmission message in a parameter of the transmission function for passing to the user-interface layer 200 by the middleware communication layer 202. Next, in block 732 the database-interface layer 204 awaits the receipt of a status query-message from the user-interface layer 200 regarding the execution-status of the task identified by its unique message-execution identification before proceeding to block 734 and the forwarding of the execution results to the user-interface layer 200 via the middleware communication layer 202. The overall operations of the processes in blocks 732 and 734 will be disclosed in greater detail in conjunction with FIG. 8 below. Returning to FIG. 7B, the process then proceeds to block 740 where the flow is returned to block 320 in FIG. 3 where the overall process draws to an end.

The processing operations of the asynchronous execution mode of the present invention summarily shown in blocks 732 and 734 of FIG. 7B will now be discussed in greater detail in FIGS. 8A–C, starting at block 800 in the user-interface layer 200 of FIG. 8A. Subsequent to the earlier receipt of the unique message execution identification from the database-interface layer 204 as shown in block 730 of FIG. 7B, in decision block 802, it is determined whether a query-response is received from the database-interface layer 204. Since no query message has yet been sent, the flow proceeds to decision block 804 where a determination is made as to a predetermined elapsed wait time interval for transmission of a query-message. If the wait time has not yet elapsed and no query response is received during the wait time, then the process continues to flow through blocks 802 and 804 until the wait time has expired, in which case the flow proceeds to block 806 where a query-message is generated. In an exemplary embodiment, the query-message is generated in substantially the same process as that of the processed user-inputted message shown in FIGS. 5A and 5B. Next, in block 808, the received unique message execution identification is included in the query message and followed by the inclusion of a predetermined attribute in block 810. In an exemplary embodiment, the predetermined attribute is a predetermined transmission function call recognized by a middleware communication layer 202 adapted to recognize the function call. The flow then proceeds to block 812 where the query message is forwarded to the middleware communication layer 202.

Once received in the middleware communication layer 202, the same set of operations is performed on the forwarded query message as with the user-inputted messages described in FIG. 6. Therefore, in block 814 of FIG. 8B, middleware communication layer 202 first searches for the predetermined attribute in each forwarded query message. In an exemplary embodiment, the middleware communication layer 202 is adapted to search for the predetermined attribute in the forwarded query message. The predetermined attribute is a predetermined transmission function call which instructs the middleware communication layer 202 to forward each received query message to the database interface layer 204 without searching the received query message for the query-message contained therein. Next, in block 816, each query message is packaged into a generated packaged query message of substantially the same form as packaged message 420 shown in FIG. 4, which is then forwarded in block 818 to the database-interface layer 204 based on the predetermined attribute in each query message. In an exemplary embodiment, the packaged message is forwarded to the database-interface layer 204 in the form of a parameter in a transmission function call invoked by the predetermined attribute in each message.

In the database-interface layer 204, the received packaged query messages are initially processed in the same way as the user-inputted messages described in blocks 701–706 in FIG. 7A. Therefore, in block 819 the forwarded packaged messages are searched for the predetermined attribute by a database-interface layer 204 adapted to search for the predetermined attribute included in the received packaged message. Then, each forwarded packaged query messages is unpacked in block 820, validated in block 822, and the data fields in each are extracted in block 824 wherein the unique message execution identification contained in the message is obtained.

Figure 8A:
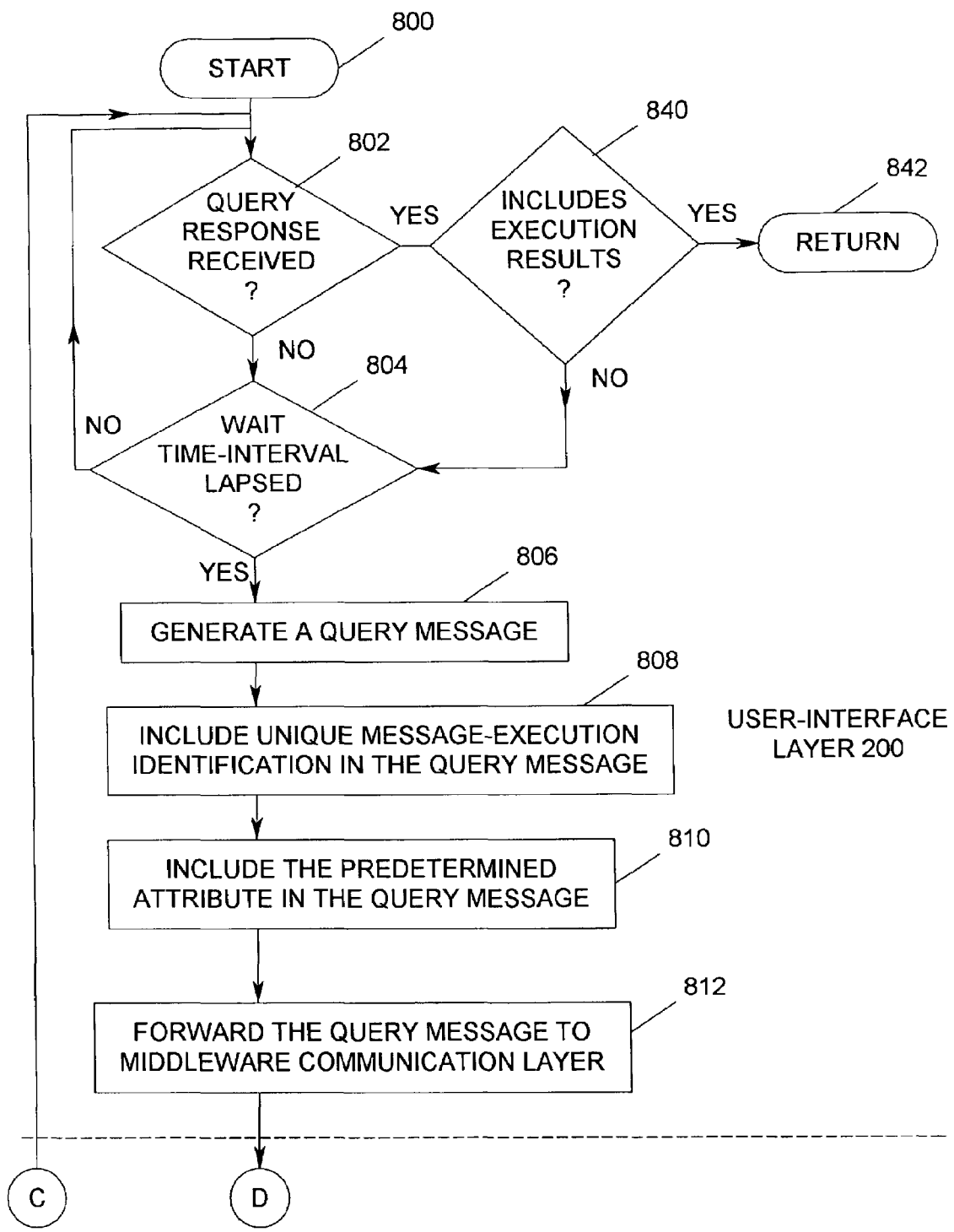
FIGS. 8A–8C collectively represent a flow chart of the process for facilitating execution of an execution-status query message according to a method of the present invention.
Figure 8B:
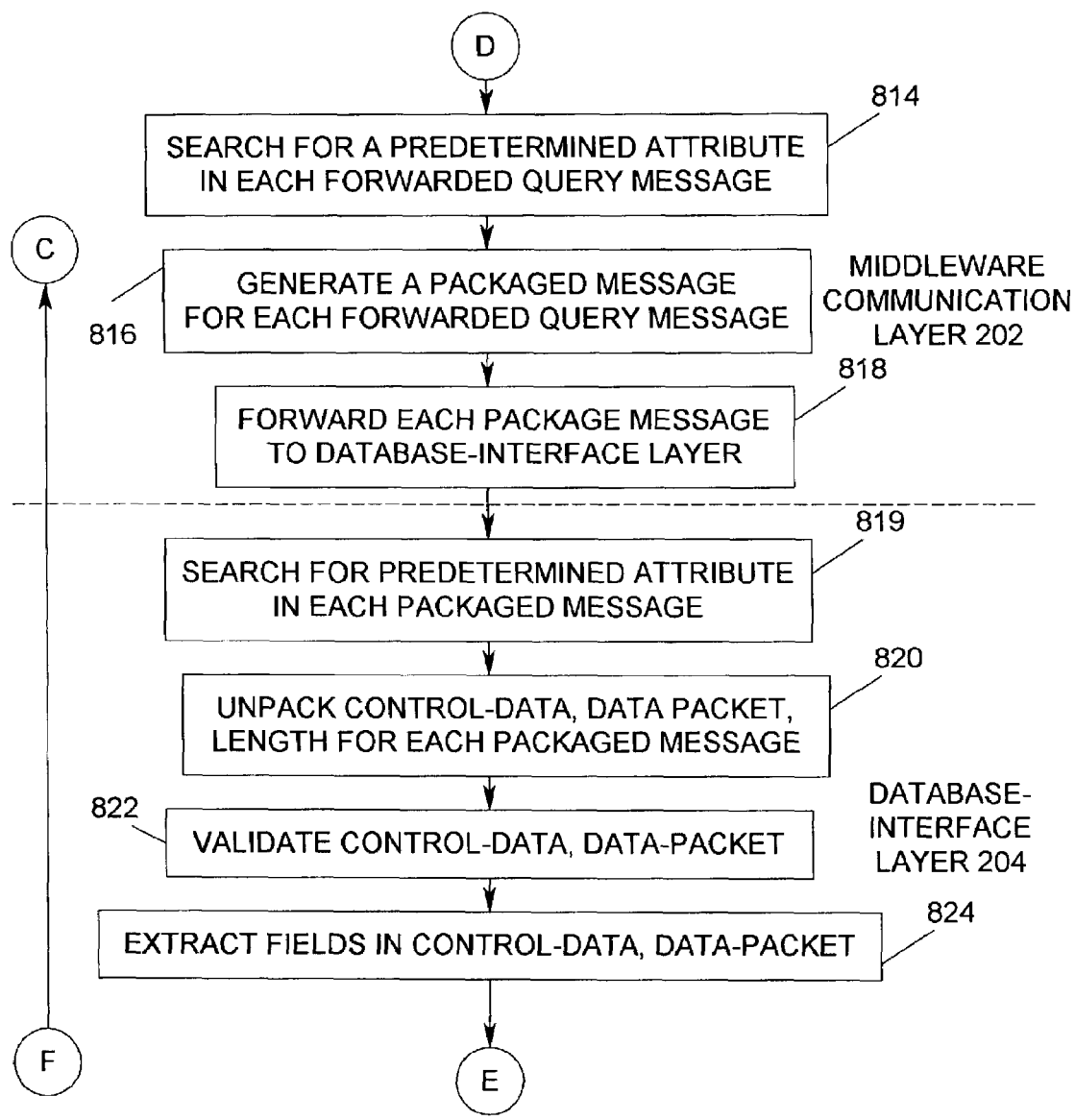
Figure 8C:
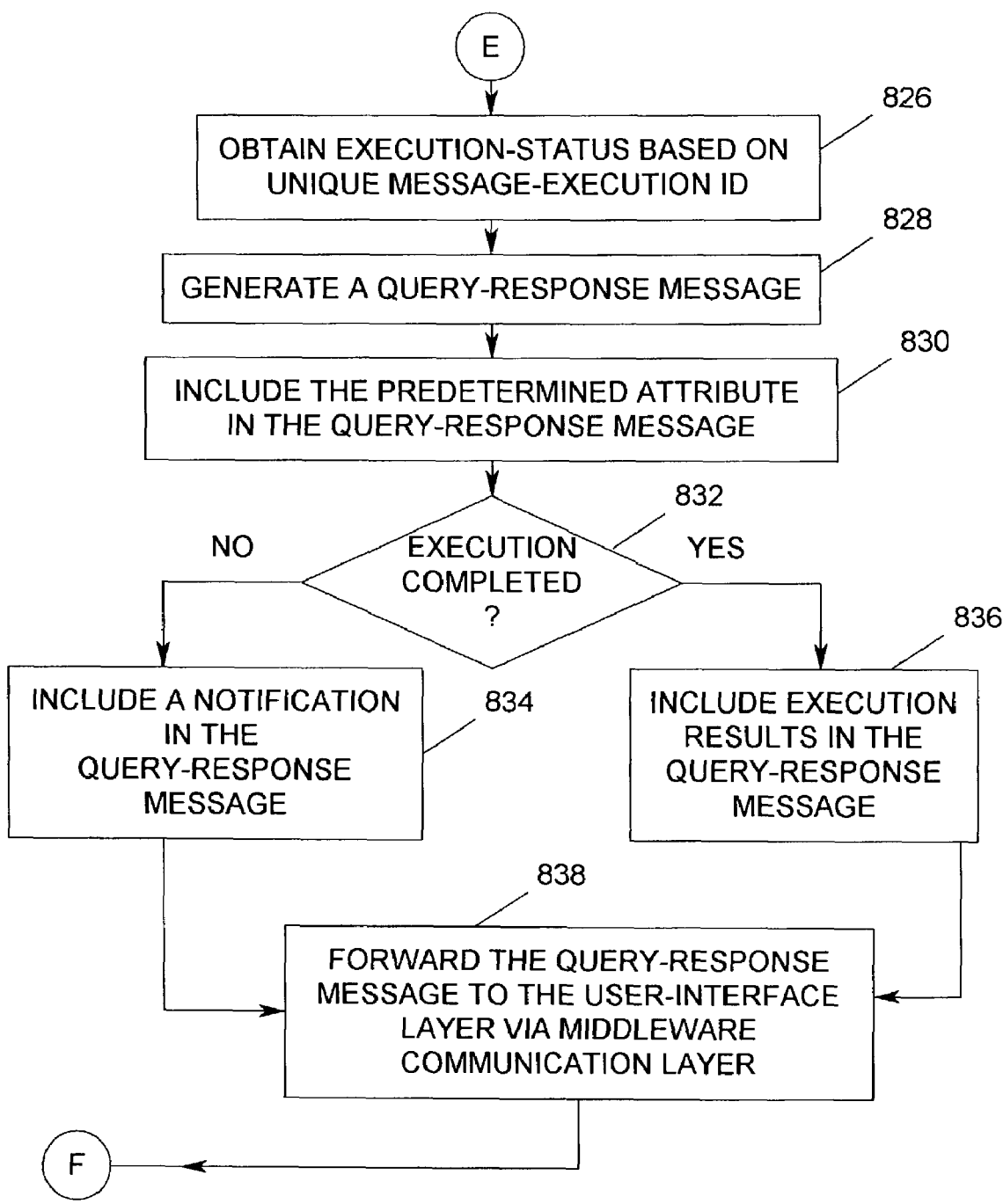

Proceeding to FIG. 8C, in block 826, an execution-status of the task identified by the unique message execution identification is obtained by database-interface layer 204 from the Enterprise database server 206. A query-response message is then generated in block 828 for forwarding to the user-interface layer 200 based on the predetermined attribute included in block 830. Next, in decision block 832, if the execution of the queried task has not been completed as determined by the obtained execution status, then the flow proceeds to block 834 where a notification of the incomplete execution-status of the task is included in the outgoing query-response message which is then, in block 838, is forwarded to the user-interface layer 200 in FIG. 8A via the middleware communication layer 202 of FIG. 8B. Once received in the user-interface layer 200, in FIG. 8A, at the decision block 802, the flow proceeds to decision block 840 where it is determined that the query-response does not contain the execution results and therefore the flow proceeds to decision block 804 where the user-interface layer 200 awaits the expiration of a predetermined wait time interval. Once the wait time interval has expired, the user-interface layer 200 generates another query message in block 806 and the foregoing overall process shown in FIGS. 8A–8C is repeated until an execution result is received.

Returning to FIG. 8C, if in decision block 830, execution of the queried task has been completed as determined by the obtained execution status, then the flow proceeds to block 836 where the execution results are included in the outgoing query-response message which is then, in block 838, is forwarded to the user-interface layer 200 in FIG. 8A via the middleware communication layer 202 of FIG. 8B. Once received in the user-interface layer 200, in FIG. 8A, at the decision block 802 the flow proceeds to decision block 840 where it is determined that the query-response contains the execution results. The process then proceeds to block 842 where the flow is returned to block 740 of FIG. 7B and eventually returned to block 320 in FIG. 3 where the overall process draws to an end.

In an exemplary embodiment, the predetermined attribute included in block 830 is the same transmission function received in the packaged message and the forwarding of the query-response is performed via inclusion of the transmission message in a parameter of the transmission function for passing to the user-interface layer 200 by the middleware communication layer 202. In an exemplary embodiment, the overall operations associated with forwarding and processing of the query message is performed in a synchronous mode.

It should be noted that the various features of the foregoing embodiments were discussed separately for clarity of description only and they can be incorporated in whole or in part into a single embodiment of the invention having all or some of these features. It should further be noted that the invention is not limited to Unisys Database Operations Centers but can readily used in conjunction with virtually any a client-server database network having a user-interface layer communicating with a database-interface layer via a middleware communication layer in which the middleware communication layer communicates with the database-interface layer to execute thereon, functions and sub-functions of tasks received from the user-interface on a one sub-function at a time basis.

Although the invention has been described with reference to specific embodiments, this description is not meant to be construed in a limiting sense. Various modifications of the disclosed embodiments as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method for facilitating execution of a user-inputted message in a client-server database network having a user-interface layer communicating with a database-interface layer via a middleware communication layer, said method comprising:

receiving said user-inputted message from said user-interface layer in said middleware communication layer;

searching for a predetermined attribute contained in said received user-inputted message wherein said predetermined attribute instructs said middleware communication layer to forward said received user-inputted message to said database-interface layer without searching said received user-inputted message for said database function call;

forwarding said received user-inputted message to said database-interface layer based on said predetermined attribute;

executing said forwarded user-inputted message in said database-interface layer based on said predetermined attribute;

modifying said middleware communication layer for said searching for said predetermined attribute in said received user-inputted message wherein said modifying is performed prior to said receiving of said user-inputted message;

wherein said database-interface layer interfaces with a database server communicating with at least one database;

wherein said user-inputted message is a system command message for administrating said at least one database;

wherein said user-inputted message includes at least one database function call for execution by said database-interface layer in said at least one database;

wherein said function call invokes execution of at least one predetermined task by said database interface layer and includes at least one sub-function call for executing a portion of said predetermined task;

wherein said predetermined attribute instructs said database interface layer to forward execution results of said task only upon substantial completion of all said sub-function calls;

wherein said received user-inputted message in said middleware communication layer includes control-data and data and wherein said data includes said function and sub-function calls;

wherein said data includes execution instructions for at least one of a synchronous or an asynchronous mode of the execution of said function call by said database-interface layer; and wherein said executing said forwarded user-inputted message in said database-interface layer further comprises:

searching for said predetermined attribute and for at least one function call and said execution instructions in said forwarded user-inputted message;

initiating at least one of a synchronous and asynchronous mode of execution of said at least one function call based on said searched execution instructions and predetermined attribute;

forwarding results of said execution of said forwarded user-inputted message to said user-interface layer upon completion of said execution if executed in a synchronous mode;

generating a unique message-execution identification for execution of said forwarded user-inputted message if executed in an asynchronous mode of execution based on said searched execution instructions; and forwarding said unique message-execution identification to said user-interface layer wherein said user-interface layer queries said database-interface layer for execution status of said forwarded user-inputted message based on said unique message-execution identification.

2. A method in accordance with claim 1, wherein said predetermined attribute is at least one of a predetermined numeric and alpha-numeric designation.

3. A method in accordance with claim 1, wherein said client-server database network having a client-end comprising said user-interface layer and said middleware communication layer, and a server-end comprising said database-interface layer.

4. A method in accordance with claim 1 further comprising:

modifying said database-interface layer to recognize said at least one predetermined task associated with said at least one function call wherein said modifying is performed prior to executing said function call by said database-interface layer.

5. A method in accordance with claim 1, further comprising:

generating a packaged message in said middleware communication layer based on said received control-data and data wherein said forwarded user-inputted message includes said packaged message.

6. A method in accordance with claim 1, said forwarding said unique message-execution identification to said user-interface layer further comprising:

generating a message-execution identification message wherein said message includes said unique message-execution identification and said predetermined attribute; and forwarding said message-execution identification message to said middleware communication layer wherein said middleware layer forwards said message to said user-interface layer based on said predetermined attribute in said message.

7. A method in accordance with claim 6, wherein said database-interface layer forwards results of said execution of said forwarded user-inputted message to said user-interface layer via said middleware communication layer upon receiving a query message from said user-interface layer if asynchronously executing said forwarded user-inputted message.

8. A method in accordance with claim 7, wherein said user-interface layer queries said database-interface layer at predetermined time intervals until receipt of said execution result.

9. A method in accordance with claim 8, wherein said query message is communicated in a synchronous mode.

10. A method in accordance with claim 9, further comprising:

receiving said query message from said middleware communication layer in said database-interface layer;

extracting said unique message-execution identification from said query message;

obtaining an execution status of said forwarded user-inputted message based on said unique message-execution identification;

generating a query-response message based on said obtaining wherein said query-response message includes said predetermined attribute and at least one of said results of said execution if said execution is completed, and a notification of an incomplete execution status if said execution is not completed; and forwarding said query-response message to said middleware communication layer wherein said middleware communication layer forwards said query-response message to said user-interface layer based on said predetermined attribute in said query-response message.

11. A method in accordance with claim 10, further comprising:

verifying the validity of said received query message prior to said extracting.

12. A method in accordance with claim 7, further comprising:

verifying the validity of said forwarded user-inputted message prior to said searching.

13. A method in accordance with claim 1, wherein said forwarded user-inputted message is a plurality of user-inputted messages and wherein said executing comprising a concurrent executing of said plurality of user-inputted messages by said database-interface layer.

14. A method in accordance with claim 3, wherein said user-interface layer is a graphical user interface (GUI) application layer.

15. A method in accordance with claim 14, wherein said GUI layer and said middleware communication layers are Windows™ applications executing in a Windows™ operating environment.

16. A system for facilitating execution of a user-inputted message in a client-server database network, said system comprising:

a middleware communication subsystem adapted to receive said user-inputted message from a user-interface subsystem, to search for a predetermined attribute contained in said received user-inputted message, and to forward said received user-inputted message to a database-interface subsystem based on said predetermined attribute;

wherein said database subsystem is adapted to execute said forwarded user-inputted message based on said predetermined attribute;

wherein said database-interface subsystem interfaces with a database server in communication with at least one database and wherein said user-inputted message is a system command message for administrating said at least one database, wherein said message includes at least one database function call for execution by said database-interface subsystem in said at least one database;
wherein said predetermined attribute instructs said middleware communication subsystem to forward said received user-inputted message to said database interface subsystem without searching said received user-inputted message for said database function call;
wherein said middleware communication subsystem is adapted to search for said predetermined attribute in said received user-inputted messages;
wherein said function call invokes execution of at least one predetermined task by said database interface subsystem and includes at least one sub-function call for executing a portion of said predetermined task;
wherein said predetermined attribute instructs said database interface layer to forward execution results of said task only upon substantial completion of all said sub-function calls;
wherein said received user-inputted message in said middleware communication subsystem includes control-data and data and wherein said data includes said function and sub-function calls;
wherein said data includes execution instructions for at least one of a synchronous or an asynchronous mode of the execution of said function call by said database-interface subsystem; and
wherein said database-interface subsystem further comprises:
 a search subsystem adapted to search for said predetermined attribute and for at least one function call and said execution instructions in said forwarded user-inputted message;
 an execution subsystem adapted to execute said at least one function call in at least one of a synchronous and asynchronous mode of execution based on said searched execution instructions and predetermined attribute;
 a message-forwarding subsystem adapted to forward results of said execution of said forwarded user-inputted message to said user-interface layer upon completion of said execution if executed in a synchronous mode;
 a generator subsystem adapted to generate a unique message-execution identification for execution of said forwarded user-inputted message if executed in an asynchronous mode of execution based on said searched execution instructions; and
 a message-forwarding subsystem adapted to forward said unique message-execution identification to said user-interface subsystem wherein said user-interface subsystem is adapted to query said database-interface subsystem for execution status of said message based on said unique message-execution identification.

17. A system in accordance with claim 16, wherein said predetermined attribute is at least one of a predetermine numeric and alpha-numeric designation.

18. A system in accordance with claim 16, wherein said client-server database network having a client-end comprising said user-interface subsystem and said middleware communication subsystem, and a server-end comprising said database-interface subsystem.

19. A system in accordance with claim 16, wherein said database-interface subsystem is adapted to recognize said at least one predetermined task associated with said at least one function call.

20. A system in accordance with claim 16, said middleware communication subsystem further comprising:
 a message-generator subsystem adapted to generate a packaged message based on said received control-data and data wherein said forwarded user-inputted message includes said packaged message.

21. A system in accordance with claim 16, said message-forwarding subsystem further comprising:
 a message-generator subsystem adapted to generate a message-execution identification message wherein said message includes said unique message-execution identification and said predetermined attribute; and
 wherein said message-forwarding subsystem forwards said message-execution identification message to said middleware communication layer wherein said middleware communication layer forwards said message to said user-interface layer based on said predetermined attribute in said message.

22. A system in accordance with claim 21, wherein said database-interface subsystem forwards results of said execution of said message to said user-interface subsystem via said middleware communication subsystem upon receiving said query message from said user-interface subsystem if asynchronously executing said forwarded user-inputted message.

23. A system in accordance with claim 22, wherein said user-interface subsystem queries said database-interface subsystem at predetermined time intervals until receipt of said execution result.

24. A system in accordance with claim 23, wherein said user-interface subsystem is adapted to query said database-interface subsystem in a synchronous mode.

25. A system in accordance with claim 24, said database-interface subsystem further comprising:
 a data-extraction subsystem adapted to extract said unique message-execution identification from said query received from said middleware communication subsystem;
 a status-obtainment subsystem adapted to obtain an execution status of said forwarded user-inputted message based on said unique message-execution identification;
 a query-response generator subsystem adapted to generate a query-response message based on said status-obtainment wherein said response includes said predetermined attribute and at least one of said result of said execution if said execution is completed and a notification of an incomplete execution status if said execution is not completed; and
 wherein said message-forwarding subsystem forwards said query-response message said middleware layer and wherein middleware layer forwards said query-response message to said user-interface layer based on said predetermined attribute in said query-response message.

26. A system in accordance with claim 25, further comprising:
 a verification subsystem adapted to verify the validity of said received query message prior to said extraction by said data-extraction subsystem.

27. A system in accordance with claim 16, further comprising:
 a verification subsystem adapted to verify the validity of said forwarded user-inputted message prior to said search by said search subsystem.

28. A system in accordance with claim 16, wherein said forwarded user-inputted message is a plurality of user-inputted messages and wherein said database-interface subsystem is adapted to concurrent execution of said plurality of user-inputted messages.

29. A system in accordance with claim 16, wherein said user-interface subsystem is a graphical user interface (GUI) application subsystem.

30. A system in accordance with claim 16, wherein said GUI application subsystem and said middleware communication subsystems are Windows™ application subsystems operating in a Windows™ operating environment subsystem.

* * * * *